(12) United States Patent
Ko et al.

(10) Patent No.: US 11,545,158 B2
(45) Date of Patent: Jan. 3, 2023

(54) ELECTRONIC APPARATUS, METHOD FOR CONTROLLING MOBILE APPARATUS BY ELECTRONIC APPARATUS AND COMPUTER READABLE RECORDING MEDIUM

(71) Applicant: SAMSUNG ELECTRONICS CO., LTD., Suwon-si (KR)

(72) Inventors: Changseog Ko, Suwon-si (KR); Jooyoun Kim, Suwon-si (KR); Jibum Moon, Suwon-si (KR); Hyeonji Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/397,363

(22) Filed: Apr. 29, 2019

(65) Prior Publication Data

US 2020/0005798 A1 Jan. 2, 2020

(30) Foreign Application Priority Data

Jun. 27, 2018 (KR) ........................ 10-2018-0073831

(51) Int. Cl.
*G10L 17/22* (2013.01)
*G10L 15/22* (2006.01)
(Continued)

(52) U.S. Cl.
CPC ....... *G10L 17/22* (2013.01); *H04N 21/41265* (2020.08); *H04N 21/42203* (2013.01); *H04M 1/72412* (2021.01); *H04M 2201/40* (2013.01)

(58) Field of Classification Search
CPC ......... G06F 3/167; G10L 17/22; G10L 17/00; G10L 17/08; G10L 17/10; G10L 15/22;
(Continued)

(56) References Cited

U.S. PATENT DOCUMENTS 9,338,493 B2 5/2016 Van Os et al.
9,591,346 B2 3/2017 Hu et al.
(Continued)

FOREIGN PATENT DOCUMENTS

JP 2017-530567 A 10/2017
KR 10-2012-0038629 A 4/2012
(Continued)

OTHER PUBLICATIONS

International Search Report dated Jul. 26, 2019 issued by the International Searching Authority in counterpart International Application No. PCT/KR2019/004551 (PCT/ISA/210).
(Continued)

*Primary Examiner* — Thomas H Maung
(74) *Attorney, Agent, or Firm* — Sughrue Mion, PLLC

(57) ABSTRACT

An electronic apparatus is provided. The electronic apparatus includes a voice receiver, a communication interface, and a processor configured to, based on a user voice being obtained through the voice receiver, identify a mobile apparatus having a user account corresponding to the user voice from among at least one mobile apparatus communicably connected to the electronic apparatus through the communication interface, and transmit a control signal corresponding to the user voice to the identified mobile apparatus through the communication interface.

11 Claims, 10 Drawing Sheets

(51) Int. Cl.
*H04N 21/422* (2011.01)
*H04N 21/41* (2011.01)
*H04M 1/72412* (2021.01)

(58) Field of Classification Search
CPC .............. G10L 15/30; G10L 2015/223; G10L 2015/227; H04N 21/4126; H04N 21/42203; H04N 21/432; H04N 21/43607; H04N 21/43615; H04N 21/43622; H04N 21/43637; H04N 21/4394; H04N 21/4532; H04N 1/32776; H04N 2201/06; H04N 2201/0075; H04M 2201/40; H04M 1/7253; H04M 1/271; H04M 1/72533; H04M 2250/74; H04M 2250/02; H04M 2250/04; H04M 15/755; H04M 15/93; H04M 2201/405; H04M 2201/41; H04M 2203/6054; H04M 2215/7222; H04M 3/385; H04M 3/4936
See application file for complete search history.

(56) References Cited

U.S. PATENT DOCUMENTS

| | | | |
|---|---|---|---|
| 9,628,286 B1* | 4/2017 | Nguyen | H04L 12/2834 |
| 10,091,545 B1* | 10/2018 | Cwik | H04N 21/4415 |
| 2012/0092563 A1 | 4/2012 | Kwon et al. | |
| 2014/0152899 A1* | 6/2014 | Newell | H04N 21/4415 348/734 |
| 2014/0342709 A1* | 11/2014 | Stepanian | G08C 17/02 455/414.1 |
| 2015/0019219 A1 | 1/2015 | Tzirkel-Hancock et al. | |
| 2015/0026580 A1* | 1/2015 | Kang | H04W 12/04 715/728 |
| 2015/0127675 A1* | 5/2015 | Kim | H04N 21/42203 707/765 |
| 2015/0154976 A1 | 6/2015 | Mutagi | |
| 2015/0162006 A1* | 6/2015 | Kummer | H04N 21/47217 704/275 |
| 2015/0271432 A1* | 9/2015 | Muth | H04W 76/14 348/552 |
| 2015/0271551 A1 | 9/2015 | Lee | |
| 2015/0302857 A1* | 10/2015 | Yamada | G06Q 30/0633 704/275 |
| 2015/0370531 A1 | 12/2015 | Faaborg | |
| 2015/0382047 A1* | 12/2015 | Van Os | G09C 1/00 725/38 |
| 2016/0021531 A1* | 1/2016 | Kim | H04M 1/67 455/411 |
| 2016/0269524 A1 | 9/2016 | Stottlemyer | |
| 2017/0006356 A1* | 1/2017 | Krasadakis | G10L 15/22 |
| 2017/0017459 A1* | 1/2017 | Bhat | H04M 1/7253 |
| 2017/0032783 A1 | 2/2017 | Lord et al. | |
| 2017/0133011 A1* | 5/2017 | Chen | H04L 12/4625 |
| 2017/0302779 A1* | 10/2017 | Zhao | G01S 5/18 |
| 2017/0357478 A1 | 12/2017 | Piersol et al. | |
| 2018/0063716 A1* | 3/2018 | Weigand | H04N 21/41265 |
| 2018/0122379 A1* | 5/2018 | Sohn | G10L 17/22 |
| 2018/0137266 A1* | 5/2018 | Kim | H04M 1/7253 |
| 2018/0199098 A1* | 7/2018 | Jang | H04N 21/4668 |
| 2018/0249222 A1* | 8/2018 | Bandela | H04N 21/25808 |
| 2019/0065037 A1* | 2/2019 | Lee | H04L 67/125 |
| 2019/0179610 A1* | 6/2019 | Aiken | H04L 12/2829 |
| 2020/0221184 A1* | 7/2020 | Skliba | H04N 21/41407 |

FOREIGN PATENT DOCUMENTS

| | | |
|---|---|---|
| KR | 10-1239177 B1 | 3/2013 |
| KR | 10-2015-0013531 A | 2/2015 |
| KR | 10-2015-0108546 A | 9/2015 |
| KR | 10-2017-0036805 A | 4/2017 |
| WO | 2017/044257 A1 | 3/2017 |
| WO | 2017078926 A1 | 5/2017 |

OTHER PUBLICATIONS

Written Opinion dated Jul. 26, 2019 issued by the International Searching Authority in counterpart International Application No. PCT/KR2019/004551 (PCT/ISA/237).
Communication dated Apr. 30, 2021 by the European Patent Office in European Application No. 19824537.5.
Communication dated Aug. 23, 2022, issued by the Korean Intellectual Property Office in Korean Patent Application No. 10-2018-0073831.

* cited by examiner

ELECTRONIC APPARATUS, METHOD FOR CONTROLLING MOBILE APPARATUS BY ELECTRONIC APPARATUS AND COMPUTER READABLE RECORDING MEDIUM

CROSS-REFERENCE TO RELATED APPLICATION(S)

This application is based on and claims priority under 35 U.S.C. § 119 to Korean Patent Application No. 10-2018-0073831, filed on Jun. 27, 2018 in the Korean Intellectual Property Office, the disclosure of which is incorporated by reference herein in its entirety.

BACKGROUND

1. Field

The disclosure relates to an electronic apparatus, a method for controlling a mobile apparatus by an electronic apparatus, and a computer readable recording medium, and more specifically to an electronic apparatus which may specify, connect, and control user's mobile apparatus using the voice of the user, and a method for controlling a mobile apparatus by the electronic apparatus and a computer readable recording medium.

2. Description of Related Art

With advances in electronic technology, various types of electronic apparatuses have been developed and provided. Especially, various electronic apparatuses such as a television (TV), a mobile phone, a personal computer (PC), a notebook PC, a Personal Digital Assistant (PDA), a set top box, etc. are used in most of general homes.

As use of the electronic apparatuses has increased, user needs for various functions have also increased. As a result, efforts of manufacturers for meeting user needs has increased and thus, products with new functions that did not exist before have been introduced.

Recently, according to user needs for using functions of a personal apparatus of a user, such as a mobile apparatus, in a TV which is a public apparatus, a method for searching, connecting and manipulating a public apparatus by using a personal apparatus has been utilized.

In this case, there has been a problem that a personal apparatus always should be physically near the user because the user has to directly control the personal apparatus, and if the personal apparatus is located away from the user, the functions of the personal apparatus could not be used in a TV.

Accordingly, needs for the technology to specify and connect a personal apparatus through a TV and to manipulate the personal apparatus have arisen.

SUMMARY

Provided are an electronic apparatus which can specify, connect and control a mobile apparatus using the voice print of a voice uttered by a user, a method for controlling a mobile apparatus by the electronic apparatus, and a computer readable recording medium.

According to an embodiment of the disclosure, there is provided an electronic apparatus including: a voice receiver; a communication interface; and a processor configured to: based on a user voice being obtained through the voice receiver, identify a mobile apparatus having a user account corresponding to the user voice from among at least one mobile apparatus communicably connected to the electronic apparatus through the communication interface, and transmit a control signal corresponding to the user voice to the identified mobile apparatus through the communication interface.

The processor may be further configured to transmit a signal of the user voice to an external server through the communication interface, and based on user account information corresponding to the user voice being received from the external server, identify a mobile apparatus having the received user account information from among the at least one mobile apparatus.

The processor may be further configured to transmit a signal of the user voice to the at least one mobile apparatus through the communication interface, and based on a response being received from a mobile apparatus having the user account corresponding to the user voice from among the at least one mobile apparatus, identify the mobile apparatus that transmits the response as a mobile apparatus which performs an operation corresponding to the user voice.

The electronic apparatus may further include a memory configured to store at least one user account corresponding to the at least one mobile apparatus, and the processor may be further configured to identify the user account corresponding to the user voice based on the at least one user account stored in the memory.

The electronic apparatus may further include a display, and the processor may be further configured to receive, through the communication interface, a screen of the identified mobile apparatus in which an operation corresponding to the control signal is performed, from the identified mobile apparatus, and display the received screen on the display.

The processor may be further configured to based on the user voice being obtained during playing of a content on the display, pause the playing of the content and display the received screen on the display, and based on an operation corresponding to the control signal being completed, resume the playing of the content.

The electronic apparatus may further include a display, and the processor may be further configured to, based on an operation corresponding to the control signal being completed in the identified mobile apparatus, display a message informing that the operation is completed on the display together with a content being played.

According to an embodiment of the disclosure, there is provided a method for controlling a mobile apparatus by an electronic apparatus, the method including: obtaining a user voice; identifying a mobile apparatus having a user account corresponding to the user voice from among at least one mobile apparatus connected to the electronic apparatus; and transmitting a control signal corresponding to the user voice to the identified mobile apparatus.

The identifying may include transmitting a signal of the user voice to an external server; receiving user account information corresponding to the user voice from the external server; and identifying a mobile apparatus having the received user account information from among the at least one mobile apparatus.

The identifying may include transmitting the signal of the user voice to the at least one mobile apparatus; receiving a response from a mobile apparatus having a user account corresponding to the user voice from among the at least one mobile apparatus; and identifying the mobile apparatus that transmits the response as a mobile apparatus which performs an operation corresponding to the user voice.

The identifying may include identifying a user account corresponding to the user voice based on at least one of user account corresponding to the at least one mobile apparatus stored in the electronic apparatus.

The method may further include receiving a screen of the identified mobile apparatus in which an operation corresponding to the control signal is performed, from the identified mobile apparatus; and displaying the received screen.

The displaying may include based on the user voice being obtained during a playing of a content, pausing the playing of the content and displaying the received screen; and based on an operation corresponding to the control signal being completed, resuming the playing of the content.

The method may further include, based on an operation corresponding to the control signal being completed in the identified mobile apparatus, displaying a message informing that the operation is completed together with a content being played.

According to an embodiment of the disclosure, there is provided a non-transitory computer readable medium which includes a program for executing a method for controlling a mobile apparatus by an electronic apparatus, wherein the method includes: obtaining a user voice; identifying a mobile apparatus having a user account corresponding to the user voice from among at least one mobile apparatus connected to the electronic apparatus; and transmitting a control signal corresponding to the user voice to the identified mobile apparatus.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
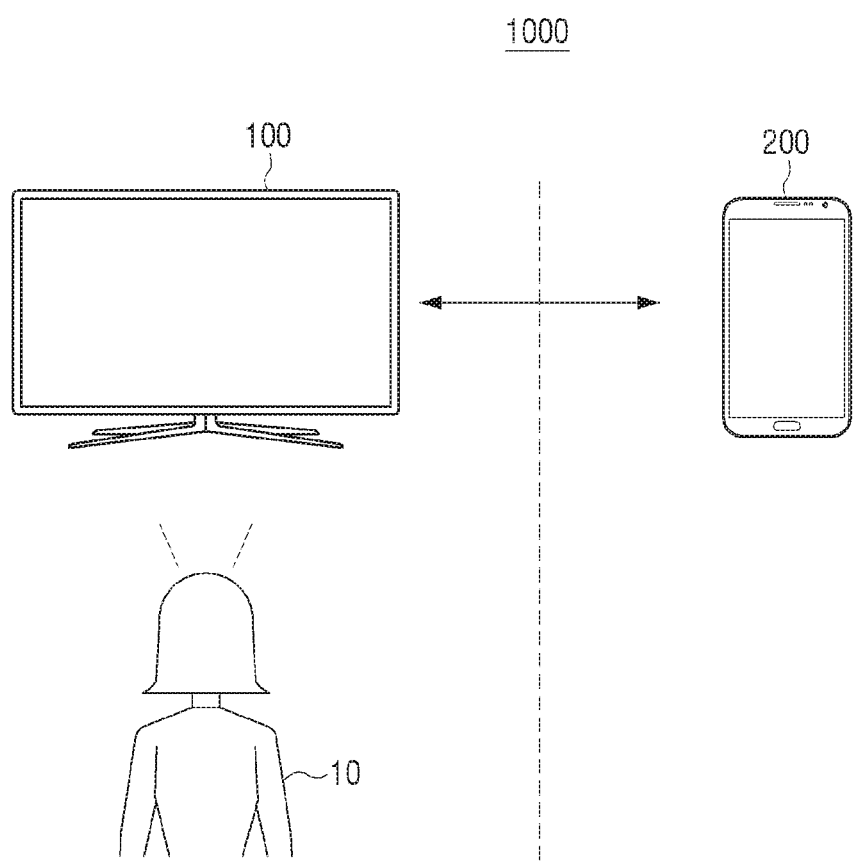
FIG. 1 is a view illustrating a mobile apparatus controlling system according to an embodiment.

The terms used in the disclosure will be briefly explained, and embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The embodiments of the disclosure may vary, and may be provided in different embodiments. Various embodiments will be described with reference to accompanying drawings. However, it is to be understood that the disclosure is not limited to a specific embodiment, but includes all modifications, equivalents, and substitutions without departing from the scope and spirit of the disclosure. While describing embodiments, if it is determined that the specific description regarding a known technology obscures the gist of the disclosure, the specific description is omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The embodiments of the disclosure will be described in greater detail below in a manner that will be understood by one of ordinary skill in the art. However, embodiments may be realized in a variety of different configurations, and not limited to descriptions provided herein. Further, those that are irrelevant with the description are omitted so as to describe embodiments more clearly, and similar drawing reference numerals are used for the similar elements throughout the description.

Hereinafter embodiments will be described in detail with reference to accompanying drawings.

FIG. 1 is a view briefly illustrating a mobile apparatus controlling system according to an embodiment.

Referring to FIG. 1, a mobile apparatus controlling system 1000 includes an electronic apparatus 100 and a mobile apparatus 200. Here, the electronic apparatus 100 and the mobile apparatus 200 may be spaced apart (distant) from each other. In addition, a user 10 may control the mobile apparatus 200 communicably connected to the electronic apparatus 100 by inputting a manipulation command to the electronic apparatus 100. Specifically, the electronic apparatus 100 may specify the mobile apparatus 200 to be controlled based on the obtained voice of the user 10 from among a plurality of mobile apparatuses 200 which can be connected to the electronic apparatus 100, and make a connection with the specified mobile apparatus 200. Here, the electronic apparatus 100 may specify the mobile apparatus 200 to be connected by using a voice print of the voice of the user 10. In addition, the electronic apparatus 100 may transmit the obtained signal of the user voice obtained from the user to the connected mobile apparatus 200. Here, the voice print is an analysis of the frequency of a voice, and can be used to identify a speaker because each person has an intrinsic form of the frequency of a voice.

The electronic apparatus 100 may be a public apparatus shared by many people. For example, the electronic apparatus 100 may be various apparatuses including a display such as a TV, an electronic book, an electronic frame, kiosk, etc. Here, the electronic apparatus 100 may receive a screen from the mobile apparatus 200 and display the screen, or if the operation regarding a user voice is completed is received from the mobile apparatus 200, may display a message informing that the operation is completed.

Alternatively, the electronic apparatus 100 may be various apparatuses which do not include a display such as a server, a set top box, an artificial intelligence speaker, etc. Here, the mobile apparatus 200 may inform that the operation regarding the user voice is completed through an output sound and the like.

The mobile apparatus 200 may be a personal apparatus having an account of each user. For example, the mobile apparatus 200 may be various apparatuses such as a mobile phone, a smart phone, a PDA, a note book, a PC, a tablet PC, etc. Here, the electronic apparatus 100 and the mobile apparatus 200 may be connected to each other in a wireless method such as Wi-Fi, Bluetooth, etc. Alternatively, the electronic apparatus 100 and the mobile apparatus 200 may be connected to each other in a wired method such as high definition multimedia interface (HDMI), etc.

In FIG. 1, the electronic apparatus 100 may directly obtain a voice of the user 10. Alternatively, the voice of the user 10 may be obtained using a microphone included in a remote controller connected to the electronic apparatus 100 and the electronic apparatus 100 may obtain the voice of the user 10 by receiving from the remote controller.

As illustrated above, according to various embodiments, even if the mobile apparatus which is a personal apparatus of a user that is located apart from the user, the user may control the mobile apparatus using the electronic apparatus which is a public apparatus. In addition, by specifying the mobile apparatus to be connected by using the voice print of the voice of the user, security may be improved when controlling the personal apparatus through the public apparatus.

Figure 2:
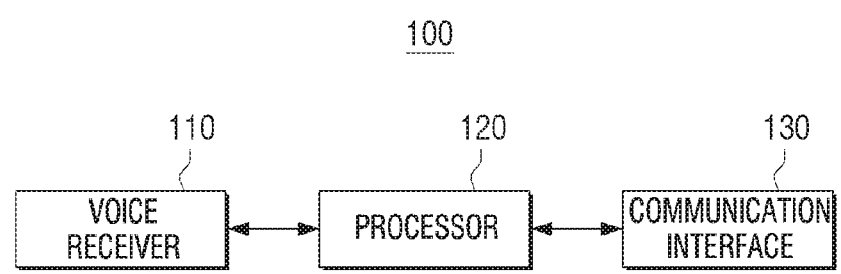
FIG. 2 is a block diagram illustrating a configuration of an electronic apparatus according to an embodiment.

FIG. 2 is a block diagram illustrating a configuration of an electronic apparatus according to an embodiment.

Referring to FIG. 2, the electronic apparatus 100 includes a voice receiver 110, a communication interface 130, and a processor 120.

The voice receiver 110 is configured to obtain a voice of a user. Specifically, the voice receiver 110 may be a microphone which receives a voice from a user and converts the voice into a voice signal which can be processed in the electronic apparatus 100.

The voice receiver 110 may be included in the electronic apparatus 100, but the voice receiver 110 may receive a voice signal from a separate microphone apparatus connected to the electronic apparatus 100. For example, the voice receiver 110 may be connected to the separate microphone in a wired or wireless method. Specifically, if the connection is performed in a wireless method, the voice receiver 110 may receive a user voice obtained from the microphone included in an apparatus communicably connected to the electronic apparatus 100 such as a remote controller or a smart phone, etc.

The communication interface 130 includes communication circuitry for performing communication with a mobile apparatus. Specifically, the communication interface 130 may transmit a signal of the obtained user voice to the mobile apparatus. In addition, the communication interface 130 may receive a screen of the mobile apparatus wherein the operation corresponding to the user voice is performed, from the mobile apparatus. Here, the communication interface 130 may be connected to an external apparatus in a wireless method such as a wireless local area network (LAN), Bluetooth, etc. In addition, the communication interface 130 may be connected to the mobile apparatus using Wi-Fi, Zigbee, and infrared Data Association (IrDA).

Further, the communication interface 130 may perform communication with a remote controller. Specifically, the communication interface 130 may receive the voice of a user obtained through the microphone included in the remote controller from the remote controller. In addition, the communication interface 130 may further include a light receiver which receives a light signal corresponding to a user input (e.g., a touch, a press, a touch gesture, a voice, or a motion) from the remote controller.

According to an embodiment, if there is an component included in the remote controller, such as a button, which may perform finger print recognition, finger print information of the user may be received from the remote controller through the communication interface 130, and the processor 120 may identify the user using the received finger print information.

The communication interface 130 may receive a content from an external apparatus. Here, the external apparatus may be a broadcast station server, a set top box, an external memory apparatus, a Blue-ray disc, a PC, a mobile apparatus such as a smart phone, etc. Here, the communication interface 130 may communicate with an external apparatus in the wireless method described above, or may communicate in a wired method and include a connection port for the communication in a wired method. For example, the communication interface 130 may include a wired Ethernet port, HDMI port, component port, PC port, USB port, etc. In addition, the communication interface 130 may include a Digital Visual Interface (DVI), Red Green Blue (RGB), DSUB, Super Video (S-Video), etc.

If a user voice is obtained through the voice receiver 110, the processor 120 may identify a mobile apparatus having the user account corresponding to the user voice from among at least one mobile apparatus which can be connected to the electronic apparatus 100. Here, the processor 120 may transmit the user voice obtained through the voice receiver 110 to an external server or at least one mobile apparatus through the communication interface 130. In addition, the processor 120 may identify the user account corresponding to the user voice and the mobile apparatus having such user account based on the response received from the external server or a response received from at least one mobile apparatus.

The processor 120 may identify the mobile apparatus having the user account corresponding to the user voice using the voice print of the user voice.

Specifically, if an external server (e.g., a voice server) for identifying a user account using the voice print is connected to the electronic apparatus 100, the processor 120 may transmit the signal of the user voice to the external server through the communication interface 130. The external server may identify the user account corresponding to the voice print of the user voice based on the signal of the user voice received from the electronic apparatus 100 and transmit the information regarding the identified user account to the electronic apparatus 100. If the information regarding the identified user account is received, the electronic apparatus 100 may identify the mobile apparatus having the identified user account information from among a plurality of mobile apparatuses which can be connected to the electronic apparatus 100. The embodiment in which the electronic apparatus 100 is connected to the voice server will be described in detail with reference to FIG. 4 below.

If an external server (e.g., a voice server) for identifying a user account using the voice print is communicably connected to the plurality of mobile apparatuses which can be connected to the electronic apparatus 100, the processor 120 may transmit the signal of a user voice to each mobile apparatus through the communication interface 130. Here, each mobile apparatus may transmit a signal of a received user voice to an external server, and receive a response regarding whether there is a user account corresponding to the voice print of the user voice from the external server. The mobile apparatus having a user account corresponding to the voice print of a user voice may transmit such response to the electronic apparatus 100. In addition, the processor 120 may identify the mobile apparatus which transmits the response as the mobile apparatus which performs the operation corresponding to the user voice. A mobile apparatus having the user account that does not correspond to the voice print may send such response to the electronic apparatus 100 or may not send any response. As in the above, an embodiment in which the mobile apparatus is connected to a voice server will be described in detail with reference to FIG. 5 below.

In addition, the processor 120 may transmit the signal of the user voice to the identified mobile apparatus through the communication interface 130. Specifically, the processor 120 may transmit the signal of the user voice to the identified mobile apparatus so that the mobile apparatus may analyze the voice signal and perform an operation. In another embodiment, the processor 120 may analyze the signal of the user voice and transmit the operation command corresponding to the voice signal to the identified mobile apparatus.

Figure 3:
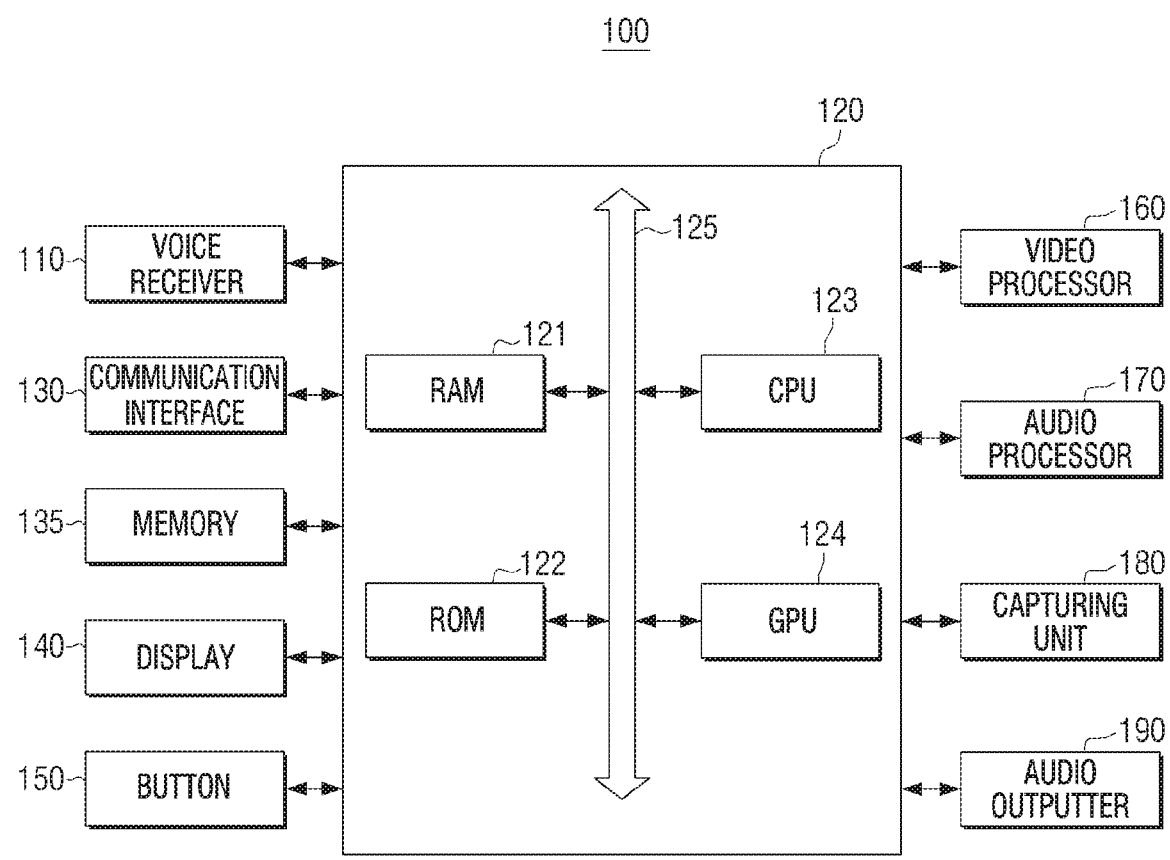
FIG. 3 is a block diagram illustrating a detailed configuration of an electronic apparatus of FIG. 2.

FIG. 3 is a block diagram illustrating a detailed configuration of an electronic apparatus of FIG. 2.

Referring FIG. 3, the electronic apparatus 100 may include the voice receiver 110, the communication interface 130, the processor 120, a memory 135, a display 140, at least one button 150, a video processor 160, an audio processor 170, a capturing unit 180, and an audio outputter 190.

Here, some operations of the voice receiver 110, the communication interface 130, and the processor 120 are the same as the configuration of FIG. 2, and thus, overlapping description will be omitted.

The processor 120 may include a random access memory (RAM) 121, a read only memory (ROM) 122, a central processing unit (CPU) 123, a graphic processing unit (GPU) 124, and a bus 125. The RAM 121, the ROM 122, the CPU 123, the GPU 124, and so on may be connected to each other through the bus 125.

The CPU 123 accesses the memory 135 to perform booting using the O/S stored in the memory 135. The CPU 123 may perform various operations by using the various programs, contents, data, and the like stored in the memory 135.

The ROM 122 stores a set of instructions for system booting. When a turn-on command is input and thus the power is supplied, the CPU 123 may copy the O/S stored in the memory 135 to the RAM 121 according to the instructions stored in the ROM 122, and boot the system by executing the O/S. When the booting is completed, the CPU 123 may copy the various programs stored in the memory 135 to the RAM 121, and perform various operations by executing the programs copied to the RAM 121.

The GPU 124 may display a user interface (UI) on the display 140 when the booting of the electronic apparatus 100 is completed. In detail, the GPU 124 may generate a screen including various objects such as an icon, an image, a text, etc. using a calculator and a renderer. The calculator may calculate attribute values such as coordinates, shape, size, and color of each object to be displayed according to the layout of the screen. The renderer may generate screens of various layouts including objects based on the attribute value calculated in the calculator. The screens (or user interface window) generated in the renderer may be provided to the display 140, and displayed on each of a main display area and a sub display area.

Hereinabove, it has been described that the processor 120 includes only one CPU 123, but the processor 120 may be implemented by a plurality of CPUs (or a digital signal processor (DSP), a system on chip (SoC), etc.) in the implementation.

The memory 135 may store various programs and data necessary for the operation of the electronic apparatus 100. To be specific, the memory 135 may include at least one command. The processor 120 may perform the above described operation by executing the command stored in the memory 135.

In addition, the memory 135 may store the user accounts of a plurality of mobile apparatuses which can be connected to the electronic apparatus 100. Specifically, the plurality of mobile apparatuses which can be connected to the electronic apparatus 100 may have been registered in the electronic apparatus 100 in advance by each user. Here, being registered may mean that the user account for each mobile apparatus is matched and stored in the memory 135. In addition, the stored user account may include identification information with which the user may be identified. The identification information may be at least one of voice print information, finger print information, face recognition information or a password of a user.

The processor 120 may identify the user account which has the voice print corresponding to the voice print of the obtained user voice from among the plurality of user accounts stored in the memory 135. Specifically, the processor 120 may compare the voice print information included in the plurality of pieces of user account information stored in the memory 135 and the voice print of the obtained user voice, and identify the voice print information or the voice print information of which conformity degree is the highest. In addition, the processor 120 may identify the user account having the identified voice print information and make a connection with the mobile apparatus having the identified user account.

In another embodiment, the processor 120 may display a plurality of mobile apparatuses stored in the memory 135 on the display 140, and may obtain a selection of one mobile apparatus which is to be connected to the electronic apparatus 100, from a user. In this case, in order to improve security, the process for obtaining identification information for identifying the user may be added. For example, the processor 120 may display a password input window of the mobile apparatus selected by a user and obtain a password input therethough. This embodiment will be described in detail with reference to FIG. 6 below.

The display 140 display 140 may be implemented as various types of displays, such as a liquid crystal display (LCD), an organic light emitting diodes (OLED) display, a plasma display panel (PDP), and the like. The display 140 may include a driving circuit, a backlight unit, and the like which may be implemented in forms such as an a-si TFT, a low temperature poly silicon (LTPS) TFT, an organic TFT (OTFT), and the like. If a touch panel is included in the display 140, the display 140 may be implemented as a touch screen which receives user's touch input. In addition, the display 140 may be a flexible display. However, according to various embodiments, the electronic apparatus 100 may not include the display 140.

The processor 120 may transmit the signal of a user voice to the identified mobile apparatus, and receive the screen on which the operation corresponding to the user voice is performed, from the identified mobile apparatus. The received screen may be the screen displayed on the identified mobile apparatus. In addition, the processor 120 may display the received screen on the display 140.

Here, if a user voice is obtained while a content provided by the electronic apparatus 100 is played, the processor 120 may pause the content being played and display the screen on which the operation corresponding to the user voice is performed, on the display 140. In addition, if the operation for the user voice is completed, the processor 120 may resume playing of the paused content. The above embodiments will be described in detail with reference to FIGS. 7 and 8 below.

If a user voice is obtained during a playback of a content, the processor 120 may transmit the signal of the user voice to the identified mobile apparatus while continuously playing the content. Thereafter, if the operation corresponding to the voice signal is completed in the mobile apparatus, the mobile apparatus may inform that the operation is completed, to the electronic apparatus 100. Here, the processor 120 may display a message informing that the operation is completely performed on a part of the screen together with the content being played. This embodiment will be described in detail with reference to FIG. 9 below.

The at least one button 150 may include various types of buttons, such as a mechanical button, a touch pad, a wheel, etc., which are formed at the front, side, or rear of the exterior of a main body.

The video processor 160 is configured to process video data included in the content received through the communication interface 130 or stored in the memory 135. The video processor 160 may perform various image processing such as decoding, scaling, noise filtering, frame rate conversion, and resolution conversion regarding the video data.

The audio processor 170 is configured to process the content received through the communication interface 130 or audio data included in the content stored in the memory 135. The audio processor 170 may perform various processing such as decoding, amplification, and noise filtering on the audio data.

When a playback application for multimedia contents is executed, the processor 120 may control the video processor 160 and the audio processor 170 to play the corresponding contents. Here, the display 140 may display the image frame generated by the video processor 160 on at least one area between a main display area and a sub-display area.

The capturing unit 180 may be a camera for capturing a still image or a moving image. Specifically, the capturing unit 180 may capture the user located in front of the electronic apparatus 100.

The processor 120 may analyze the image captured by the capturing unit 180 and identify the user, and use the information regarding the identified user as identification information. Here, the data for identifying a user may be stored in the memory 135 or an external server in advance. For example, in the above embodiment, the user is identified using the voice print information of the user, but the user may be identified using the face recognition information of the user.

The audio outputter 190 may output the audio data generated by the audio processor 170. Specifically, even if the electronic apparatus 100 does not include the display 140, if the operation corresponding to the user voice is completely performed in the mobile apparatus to which the signal of a user voice is transmitted, the processor 120 may control the audio outputter 190 to output the notification for providing a feedback to a user regarding the completion of the operation.

In addition, in some embodiments, the electronic apparatus 100 may further include a USB port to which a USB connector can be connected, various external input ports for the connection of various external terminals such as a headset, a mouse, and a LAN, and a DMB chip for receiving and processing a digital multimedia broadcasting (DMB) signal, various sensors, and so on, needless to say.

Figure 4:
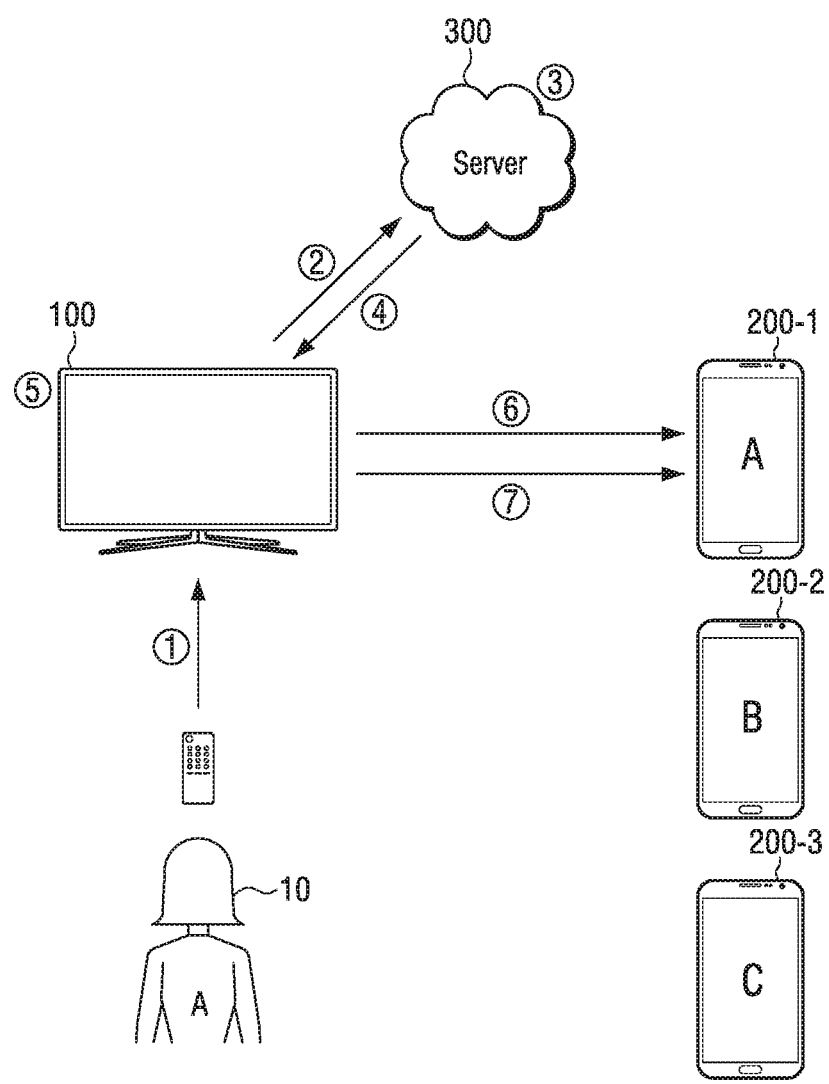
FIGS. 4, 5, and 6 are views illustrating various embodiments of a method for specifying a mobile apparatus for performing controlling by an electronic apparatus.
Figure 5:
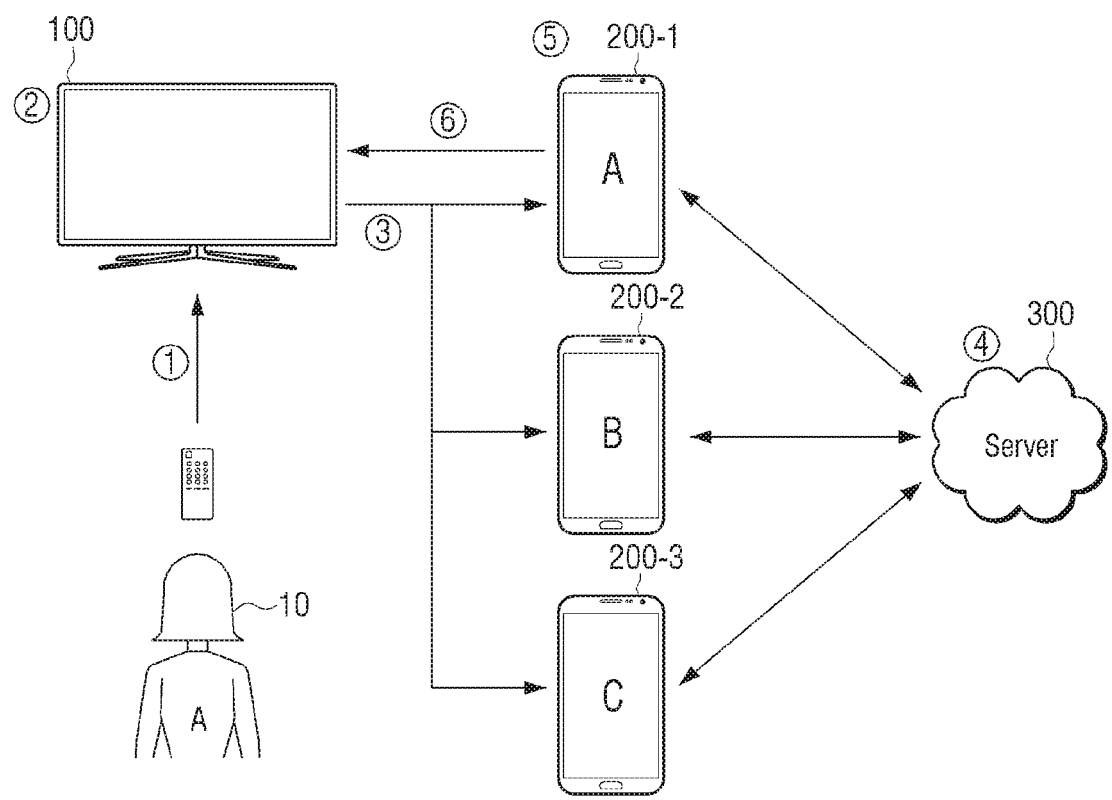
Figure 6:
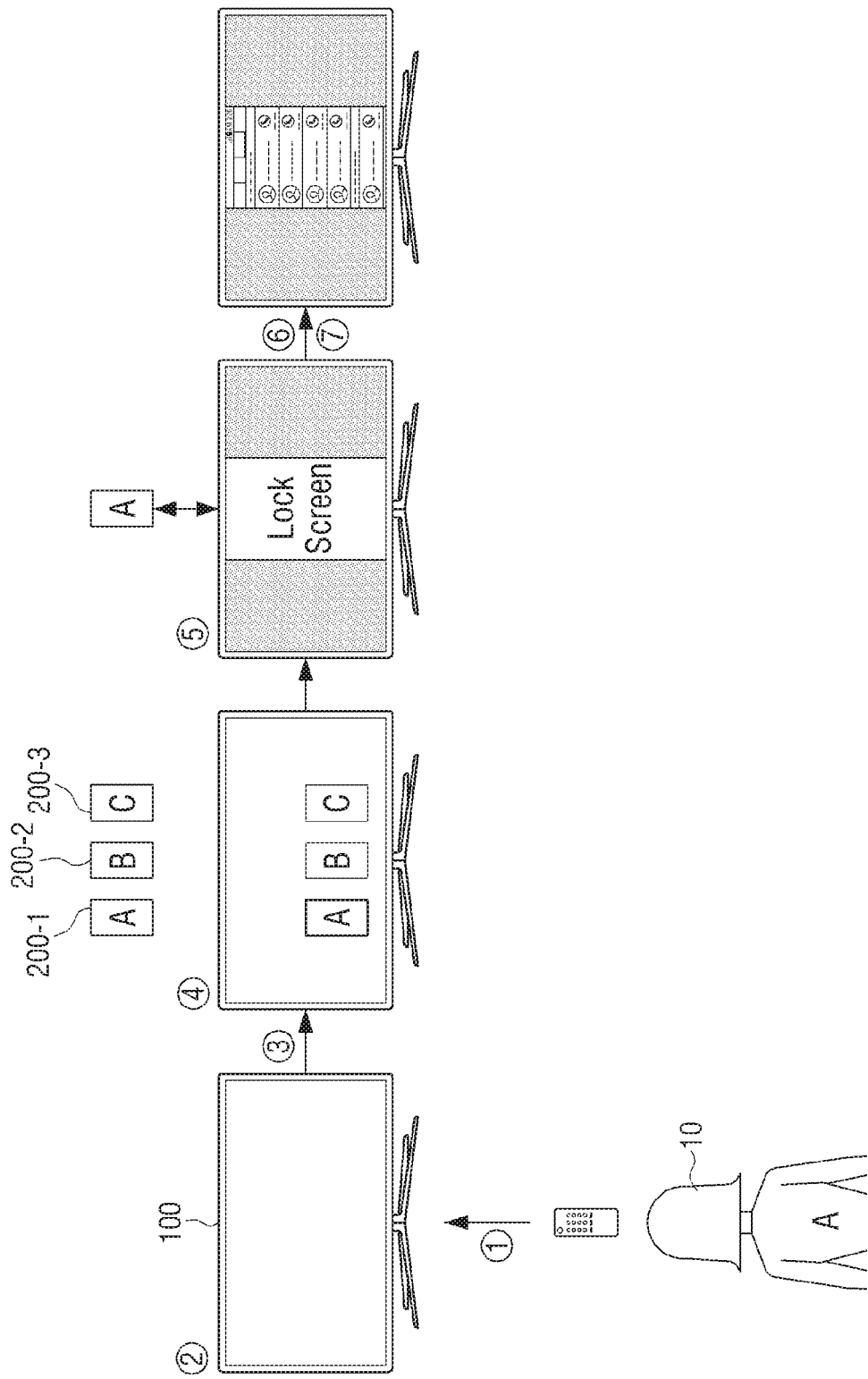

FIGS. 4, 5, and 6 are views illustrating various embodiments of a method for specifying a mobile apparatus to be controlled through the electronic apparatus. Specifically, FIG. 4 illustrates an embodiment in which the electronic apparatus 100 and an external server 300 are connected to each other. In addition, in FIG. 4, the electronic apparatus 100 can be communicably connected to a mobile apparatus A 200-1, a mobile apparatus B 200-2, and a mobile apparatus C 200-3, and these mobile apparatuses may be registered in the electronic apparatus 100 in advance.

Referring to FIG. 4, first, a user A 10 may utter the voice for a mobile apparatus connection to the electronic apparatus 100 in ①. Specifically, if the user A 10 presses the voice button included in the remote controller and speaks "Show me the latest call list of my phone", the electronic apparatus 100 may obtain "Show me the latest call list of my phone" as a user voice.

FIG. 4 shows an embodiment in which a voice is obtained by using a microphone included in the remote controller which communicates with the electronic apparatus 100, but the voice can be obtained using the microphone included in the electronic apparatus 100 without the remote controller. Specifically, if the user A 10 utters a trigger voice, the electronic apparatus 100 may obtain the voice following the trigger voice. For example, if the user A 10 utters "Hi, Bixby" (which is an example of the trigger voice) and then utters "Show me the latest call list of my phone", the electronic apparatus 100 may obtain "Show me the latest call list of my phone" which is the following voice of the trigger voice as a user voice. However, "Hi, Bixby" is merely an example of the trigger voice and embodiments are not limited thereto. In addition, 'the latest call list' is also an example, and various functions which can be used in a mobile apparatus such as a message confirmation, transmission, application execution and the like may be applied.

If the user voice is obtained, the electronic apparatus 100 may transmit the obtained user voice to the external server 300 in ②. In addition, the external server 300 may identify the user account corresponding to the voice print of the user voice and identify the function corresponding to the user voice in ⓔ. That is, the external server 300 may be an apparatus that performs a voice recognition function that analyzes the voice and derives a speaker and contents of the voice.

Specifically, the external server 300 may divide "my phone" and "show me the latest call list" from "Show me the latest call list of my phone" which is the received user voice. In addition, the external server 300 may analyze "my phone"

and identify the user account of the user A 10, and analyze "show me the latest call list" and identify the function of executing and displaying the latest call list in the mobile apparatus having the user account of the user A 10.

The external server 300 may transmit the identified user account and function to the electronic apparatus 100 in ④. The electronic apparatus 100 may search for a mobile apparatus having the user account received from the external server 300 from among at least one of the mobile apparatuses 200-1 to 200-3 which can be connected, in ⑤.

In addition, the electronic apparatus 100 may make a connection with the searched mobile apparatus A 200-1 in ⑥, and transmit the identified function to the mobile apparatus A 200-1 in ⑦. According thereto, the mobile apparatus A 200-1 may perform the function corresponding to the user voice input to the electronic apparatus 100.

According to an embodiment, the mobile apparatus A 200-1 may transmit the screen of the mobile apparatus on which the function is being performed to electronic apparatus 100 so that the electronic apparatus 100 displays the screen of mobile apparatus A 200-1 on which the function is being performed. Alternatively, the mobile apparatus A 200-1 may transmit only the information informing that the function is completely performed to the electronic apparatus 100 without the screen of the mobile apparatus, and in this case, the electronic apparatus 100 may display only the message informing that the function is completely performed in the mobile apparatus A 200-1 without displaying the screen of the mobile apparatus.

FIG. 5 illustrates an embodiment in which at least one mobile apparatus 200-1, 200-2, and 200-3 which can be connected to the electronic apparatus 100 is connected to the external server 300. Here, the mobile apparatus which can be connected may be registered in the electronic apparatus 100 in advance.

Referring to FIG. 5, first, a user A 10 may utter the voice for a mobile apparatus connection to the electronic apparatus 100 in ①. Specifically, if the user A 10 presses the voice button included in the remote controller and speaks "Show me the latest call list of my phone", the electronic apparatus 100 may obtain "Show me the latest call list of my phone" as a user voice.

In FIG. 5, the embodiment in which a voice is obtained by using a microphone included in the remote controller which communicates with the electronic apparatus 100 has been described, but the voice can be obtained using the microphone included in the electronic apparatus 100 without the remote controller. Specifically, if the user A 10 utters a trigger voice, the electronic apparatus 100 may obtain the voice following the trigger voice. For example, if the user A 10 utters "Hi, Bixby", which is an example of the trigger voice, and then utters "Show me the latest call list of my phone", the electronic apparatus 100 may obtain "Show me the latest call list of my phone" which is the following voice of the trigger voice as a user voice. However, "Hi, Bixby" is merely an example of the trigger voice and embodiments are not limited thereto.

If the user voice is obtained, the electronic apparatus 100 may identify whether the connection with the mobile apparatus is required, in ②. Specifically, the electronic apparatus 100 may identify whether the connection with the mobile apparatus is required for performing the function corresponding to the obtained user voice, or whether the function corresponding to the obtained user voice is a function included in the electronic apparatus 100. Specifically, if the voice that means an external mobile apparatus such as "phone" is included in the voice uttered by the user A 10 such as "Show me the latest call list of my phone", the electronic apparatus 100 may identify that the connection with the external mobile apparatus is required.

If the electronic apparatus 100 can be connected with both of a smart phone and a tablet PC, the electronic apparatus 100 may recognize "phone" uttered by the user A 10 and in this case, the electronic apparatus 100 may make a connection with the mobile phone and a smart phone except for the tablet PC.

If it is determined that the connection with a mobile apparatus is required, the electronic apparatus 100 may transmit the obtained user voice to at least one of the mobile apparatuses 200-1 to 200-3 which can be connected, in ③. In addition, at least one of the mobile apparatuses 200-1 to 200-3 may transmit each of the received user voice to the connected external server 300. In addition, the external server 300 may identify the user account corresponding to the voice print of the user voice and identify the function corresponding to the user voice in ④. That is, the external server may be an apparatus that performs a voice recognition function that analyzes a voice and identifies the speaker and contents of the voice.

Here, identifying the user account may mean that the external apparatus 300 identifies whether the user account of a mobile apparatus corresponds to the user account corresponding to the user voice.

Specifically, the external server 300 may determine whether the user account corresponding to the voice print of the received user voice corresponds to the user account of each of the mobile apparatuses 200-1 to 200-3 that transmits the voice. If it is determined that the user account of the mobile apparatus A 200-1 corresponds to the user account corresponding to the voice print of the user voice, the external server 300 may transmit the response that the user accounts correspond to each other to the mobile apparatus A 200-1. In addition, the external server 300 may transmit the response that the user account is not the same or may not transmit any response to the mobile apparatus B 200-2 and the mobile apparatus C 200-3 of which user accounts do not correspond to the user account corresponding to the voice print of the received user voice.

The mobile apparatus A 200-1 which receives the response that the user account thereof corresponds to the user account corresponding to the voice print of the received user voice may perform the operation corresponding to the received user voice in ⑤. In addition, the mobile apparatus A 200-1 may make a connection with the electronic apparatus 100 in ⑥.

According to an embodiment, the mobile apparatus A 200-1 may transmit the screen of the mobile apparatus on which the function is being performed to the electronic apparatus 100 so that the electronic apparatus 100 displays the screen of the mobile apparatus A 200-1 on which the function is being performed. Alternatively, the mobile apparatus A 200-1 may transmit only the information informing that the function is completely performed to the electronic apparatus 100 without transmitting the screen of the mobile apparatus, and in this case, the electronic apparatus 100 may display only the message informing that the function is completely performed in mobile apparatus A 200-1 without displaying the screen of the mobile apparatus.

FIG. 6 illustrates another embodiment that the electronic apparatus 100 can be connected to at least one mobile apparatus 200-1 to 200-3, but may not be connected to the external server. Here, the mobile apparatus which can be connected may be registered in the electronic apparatus 100 in advance. That is, FIG. 6 illustrates an embodiment in which the electronic apparatus 100 performs voice recognition.

Referring to FIG. 6, first, a user A 10 may utter the voice for a mobile apparatus connection to the electronic apparatus 100 in ①. Specifically, if the user A 10 presses the voice button included in the remote controller and speaks "Show me the latest call list of my phone", the electronic apparatus 100 may obtain "Show me the latest call list of my phone" as a user voice.

In FIG. 6, the embodiment in which a voice is obtained by using a microphone included in the remote controller which communicates with the electronic apparatus 100 has been described, but the voice can be obtained using the microphone included in the electronic apparatus 100 without the remote controller. Specifically, if the user A 10 utters a trigger voice, the electronic apparatus 100 may obtain the voice following the trigger voice. For example, if the user A 10 utters "Hi, Bixby", which is an example of the trigger voice, and then utters "Show me the latest call list of my phone", the electronic apparatus 100 may obtain "Show me the latest call list of my phone" which is the following voice of the trigger voice as a user voice. However, "Hi, Bixby" is merely an example of the trigger voice and embodiments are not limited thereto.

If the user voice is obtained, the electronic apparatus 100 may identify the user account corresponding to the voice print of the user voice and identify the function corresponding to the user voice in ②. That is, the electronic apparatus 100 may be an apparatus that performs a voice recognition function that analyzes the voice and derives the speaker and contents of the voice.

Specifically, the electronic apparatus 100 may divide "my phone" and "Show me the latest call list" from "Show me the latest call list of my phone" which is the received user voice. In addition, the external server 300 may analyze "my phone" and identify the user account and type of the apparatus of the user A 10, and analyze "Show me the latest call list" and identify the function of executing and displaying the latest call list in the mobile apparatus having the user account of the user A 10.

In addition, the electronic apparatus 100 may search for at least one of the mobile apparatuses 200-1 to 200-3 which can be connected, in ③. The electronic apparatus may make a connection with the mobile apparatus that corresponds to the identified user account from among at least one of the mobile apparatuses 200-1 to 200-3 which is searched as an apparatus that may be connected to the electronic apparatus 100 in ④. For example, if the user account corresponding to the voice print of the user voice is the user account of the user A 10, the electronic apparatus 100 may make a connection with the mobile apparatus A 200-1 having the user account of the user A 10.

In another embodiment, the electronic apparatus 100 may display at least one of the searched mobile apparatuses 200-1 to 200-3 and receive the selection of the mobile apparatus to be connected, from a user. In this case, the electronic apparatus 100 may make a connection with the mobile apparatus A 200-1 selected by the user and display a lock screen of the mobile apparatus A 200-1 in ⑤. In addition, if the user A 10 inputs the password for unlocking the lock screen, the electronic apparatus 100 may transmit the input password to the mobile apparatus A 200-1 and if the home screen of which lock screen is unlocked is received, the electronic apparatus 100 may display the home screen, in ⑥.

This process enhances security by selecting a mobile apparatus according to the selection of a user, and if the connection with a mobile apparatus is made by using the user account identified according to the user voice recognition, the above described processes ⑤ and ⑥ may be omitted.

In addition, the electronic apparatus 100 may transmit the command for performing the identified function to the mobile apparatus A 200-1, and receive and display the screen of the mobile apparatus A 200-1 on which the function is performed, in ⑦.

The mobile apparatus A 200-1 may transmit only the information informing that the function is completely performed to the electronic apparatus 100 without transmitting the screen of the mobile apparatus, and in this case, the electronic apparatus 100 may display only the message informing that the function is completely performed in mobile apparatus A 200-1 without displaying the screen of the mobile apparatus.

Figure 7:
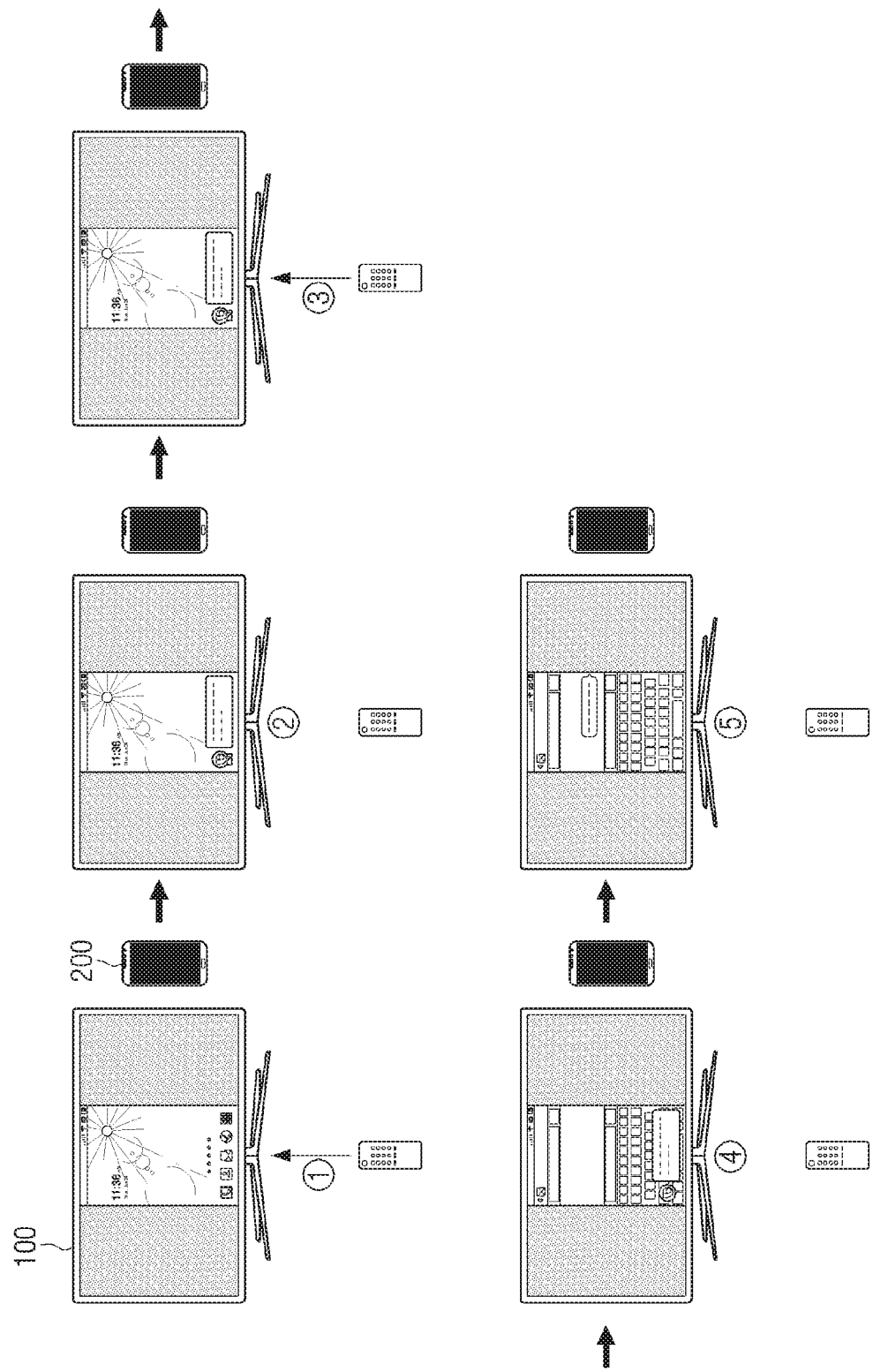
FIG. 7 is a view illustrating an operation for controlling a mobile apparatus by an electronic apparatus according to an embodiment.

FIG. 7 is a view illustrating an operation for controlling a mobile apparatus by an electronic apparatus according to an embodiment.

Referring to FIG. 7, the electronic apparatus 100 may specify one mobile apparatus 200 from among a plurality of mobile apparatuses which can be connected and make a connection to the specified mobile apparatus 200. Here, the specified mobile apparatus 200 may be the mobile apparatus having a user account corresponding to the voice print of the user voice.

In addition, the electronic apparatus 100 may receive a home screen of the connected mobile apparatus 200 and display the received home screen of the mobile apparatus 200. As in the above, the operation for displaying the screen of the mobile apparatus 200 on the electronic apparatus 100 as it is may be referred to as 'mirroring' and if the mirroring operation is performed, the screen of the mobile apparatus 200 may not be displayed on the mobile apparatus 200 to save power. Here, according to the difference of the ratio of the screen of the mobile apparatus 200 and the screen of the electronic apparatus 100, the area of the display of the electronic apparatus 100 other than the area wherein the screen of the mobile apparatus 200 is displayed may be displayed in black, gray, etc.

In FIG. 7, the electronic apparatus 100 has been described together with the mobile apparatus 200 for a convenience of description, but in the implementation, the electronic apparatus 100 may be disposed apart from the mobile apparatus 200.

While the electronic apparatus 100 is connected to the mobile apparatus 200, if a user presses the button disposed at the remote controller of the electronic apparatus 100 for inputting a voice in ① or utters a trigger voice, the electronic apparatus 100 may display a UI informing that the voice recognition can be performed in ②. In addition, while the UI informing that the voice recognition can be performed is displayed on the screen, a user may utter the voice for controlling the mobile apparatus to the electronic apparatus 100 in ③. For example, as illustrated in FIG. 7, the user may utter the voice "Show me the message screen".

The electronic apparatus 100 may display the message screen of the mobile apparatus 200 on the home screen of the mobile apparatus 200. Specifically, as the voice of a user "Show me the message screen" is obtained, the electronic apparatus 100 may transmit the obtained voice to the mobile apparatus 200. The mobile apparatus 200 may recognize the received voice and perform the operation corresponding to the voice.

If the screen on which the function is performed is received from the mobile apparatus 200, the electronic apparatus 100 may display the received screen in ④. While the message screen is displayed, the user may utter the voice "Send a message that see you tomorrow". As the voice of the user "Send a message that see you tomorrow" is obtained, the electronic apparatus 100 may transmit the obtained voice to the mobile apparatus 200. The mobile apparatus 200 may recognize the received voice and perform the operation corresponding to the voice. For example, the mobile apparatus 200 may send a message 'see you tomorrow' and transmit the screen displayed the transmitted message to the electronic apparatus 100. The electronic apparatus 100 may display the screen displayed the transmitted message of the mobile apparatus 200 in ⑤. If the operation regarding user's voice input is completed, the electronic apparatus 100 may not display the UI showing that the voice recognition is available.

In another embodiment, the electronic apparatus 100 may perform the voice recognition and may transmit only the command regarding the corresponding function to the mobile apparatus 200. In addition, the mobile apparatus 200 may perform the function for displaying a message screen and transmit the screen displaying the message screen to the electronic apparatus 100.

As described above, according to various embodiments, the mobile apparatus to be controlled can be specified and connected only by the utterance to the electronic apparatus, and by inputting the operation command to the electronic apparatus, the connected mobile apparatus can be controlled. According thereto, the user convenience is improved.

Figure 8:
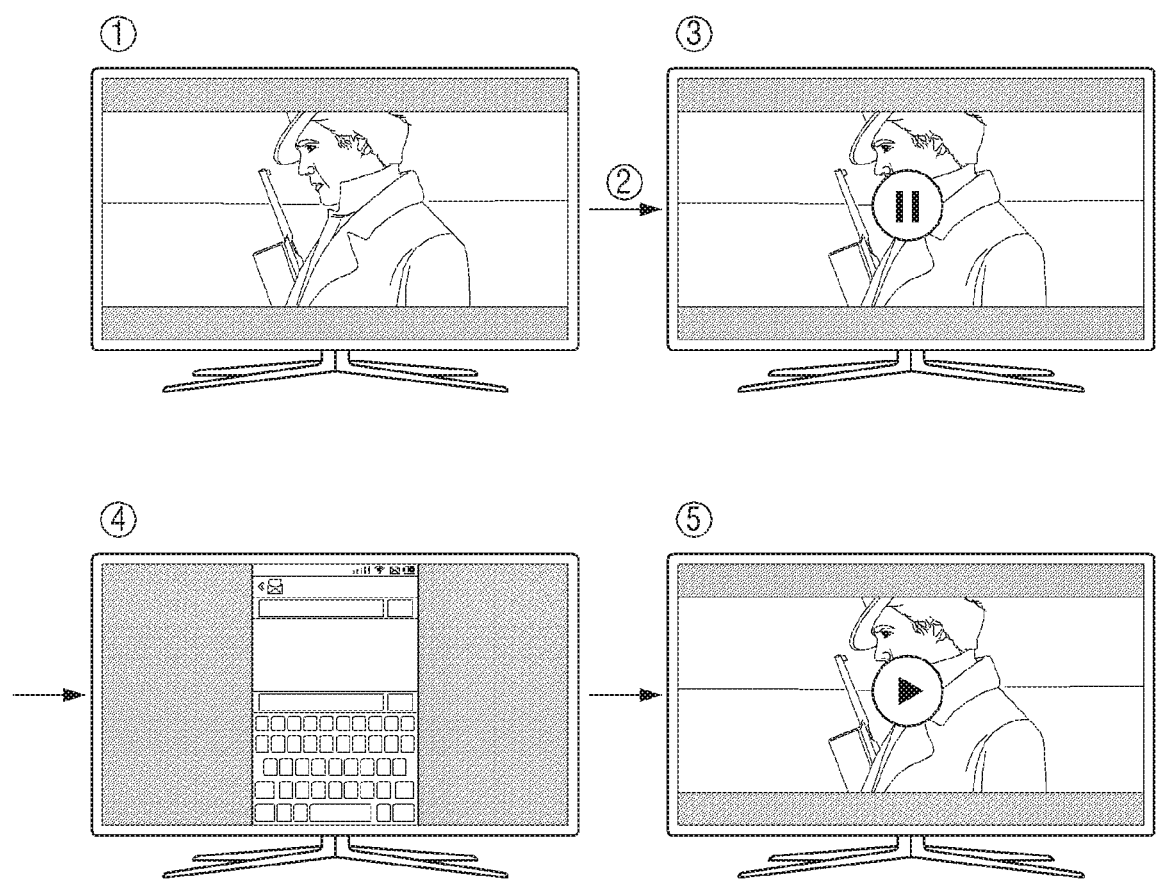
FIGS. 8 and 9 are views illustrating various embodiments of a content reproducing operation of an electronic apparatus according to controlling a mobile apparatus using an electronic apparatus.
Figure 9:
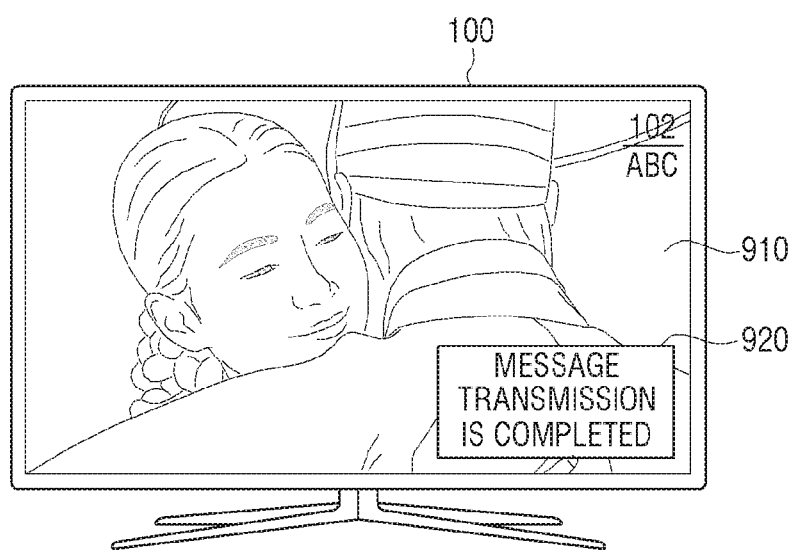

FIGS. 8 and 9 are views illustrating various embodiments of a content playback operation of an electronic apparatus according to that a mobile apparatus is controlled using the electronic apparatus.

Specifically, FIG. 8 illustrates an embodiment that while a content is played, if a user voice is obtained, the playback of the content is paused and the operation corresponding to the user voice is performed.

Referring to FIG. 8, the electronic apparatus 100 may play a content in ①. Here, the played content may be the content stored in the electronic apparatus 100 or received from an external server, and may be played using the application installed in the electronic apparatus 100.

Here, if the electronic apparatus 100 obtains a user voice according to the utterance of the user in ②, a the electronic apparatus may pause playing of the content in ③. In addition, the electronic apparatus may display the screen of the mobile apparatus having the user account corresponding to the voice print of the obtained user voice in ④. Here, the displayed screen of the mobile apparatus may be the screen of the mobile apparatus in which the function corresponding to the obtained user voice is performed. For example, if a user utters "Show me the message screen of my phone" while a content is played, the electronic apparatus 100 may pause the playing of the content and display the message screen of the mobile apparatus of the user.

If the operation corresponding to the voice uttered by the user is completed, the electronic apparatus 100 may resume the paused content in ⑤. Specifically, after the operation corresponding to the voice uttered by the user is completed, if a following command is not input within a predetermined time, the electronic apparatus 100 may determine that the control of the mobile apparatus of the user is completed and resume playing of the paused content.

As in the above, a user does not input the command regarding the selection, connection, disconnection, etc. of the mobile apparatus in addition to the input of the voice command for operating the mobile apparatus, and thus, the user convenience is improved.

FIG. 9 is a view illustrating an embodiment in which when a user voice is obtained during the playback operation of a content, a mobile apparatus is controlled while maintaining the playback of the content.

Referring to FIG. 9, the electronic apparatus 100 may play the content 910. For example, the electronic apparatus 100 may play the content broadcast on a TV channel. This is merely an example, and the electronic apparatus 100 may play the content stored in the electronic apparatus 100 or the content provided from an external storage.

Here, if the electronic apparatus 100 obtains a user voice according to the utterance of the user, the electronic apparatus 100 may make a connection with the mobile apparatus having the user account corresponding to the voice print of the user voice obtained while the playback of the content is maintained, and transmit the signal of the user voice to the connected mobile apparatus.

Here, the mobile apparatus may perform the function corresponding to the user voice and inform that the function is completely performed to the electronic apparatus 100. If the electronic apparatus 100 is informed that the operation corresponding to the user voice is completely performed in the mobile apparatus, may provide the feedback that the operation is completely performed. For example, the electronic apparatus 100 may display the message 920 informing that the operation is completely performed at some area of the screen wherein the content 910 is displayed, for a predetermined time. In another embodiment, the electronic apparatus 100 may output the sound informing that the operation is completely performed.

As described above, according to the embodiment in which the completion of the operation is informed without changing a screen, the mobile apparatus disposed spaced apart from the electronic apparatus can be manipulated without stopping the content being watched by a user, and thus, there is an effect that the user convenience is improved.

Figure 10:
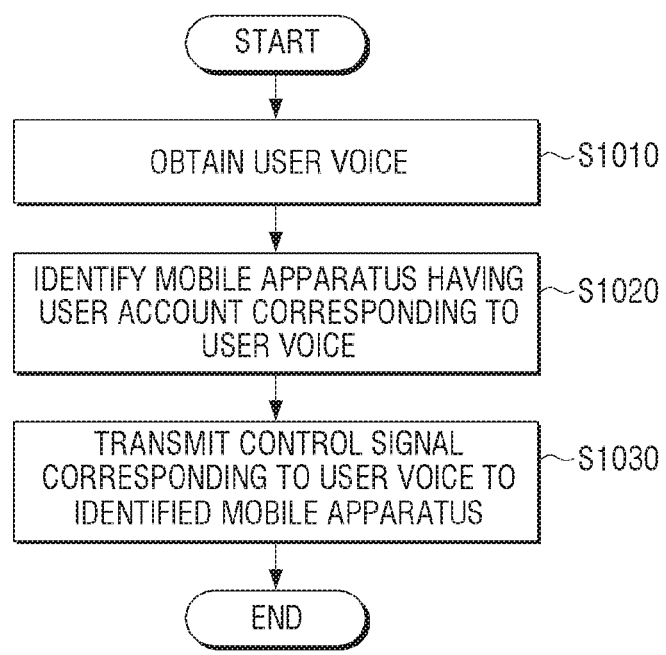
FIG. 10 is a flowchart illustrating a method for controlling a mobile apparatus by an electronic apparatus according to an embodiment.

FIG. 10 is flow chart illustrating a method for controlling a mobile apparatus by an electronic apparatus according to an embodiment.

First, the electronic apparatus may obtain a user voice in S1010. Specifically, the electronic apparatus may obtain the user voice using the microphone included in the electronic apparatus or obtain the user voice using the microphone included in the remote controller that controls the electronic apparatus.

Next, the electronic apparatus may identify the mobile apparatus having the user account corresponding to the user voice in S1020. Specifically, if an external server that performs a voice recognition is connected to the electronic apparatus, the electronic apparatus may transmit the obtained user voice and receive the user account information corresponding to the voice print of the user voice from the external server.

Next, the electronic apparatus may transmit the control signal corresponding to the user voice to the identified mobile apparatus in S1030. Specifically, the electronic apparatus may search for the mobile apparatus having the received user account information from among at least one mobile apparatus which can be connected, and make a connection with the searched mobile apparatus. In addition, the electronic apparatus may transmit the control signal corresponding to the user voice to the connected mobile apparatus. Further, the electronic apparatus may receive the screen on which the operation corresponding to the control signal is performed from the mobile apparatus and display the screen, or receive an operation completion notification and display the operation completion message.

If each of at least one mobile apparatus which can be connected to the electronic apparatus is connected with the external server, the electronic apparatus may transmit the obtained user voice to each mobile apparatus. Here, each mobile apparatus may transmit the signal of the received user voice to the external server and receive the response regarding whether the user account of the mobile apparatus is the same as the user account corresponding to the voice print of the user voice, from the external server. The mobile apparatus that receives the response that the user account is the same may perform the function corresponding to the user voice, make a connection with the electronic apparatus, and transmit the screen on which the function is performed to the electronic apparatus. If the screen on which the function is performed is received, the electronic apparatus may display the screen.

As described above, according to various embodiments, the user may control the mobile apparatus which is being spaced apart from the user, by using the electronic apparatus, and the mobile apparatus to be connected to the electronic apparatus may be connected and controlled without the process of selection, connection, etc., and thus, the user convenience may be improved. In addition, by using the voice print of the user voice, the vulnerabilities of security which may occur when operating a personal apparatus using a public apparatus may be reduced.

Various embodiments described above may be implemented in a recording medium that may be read by a computer or a similar apparatus to the computer by using software, hardware, or a combination thereof. According to the hardware embodiment, embodiments that are described in the disclosure may be implemented by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, embodiments that are described in the disclosure may be embodied as the processor 120 itself. In a software embodiment, various embodiments described in the disclosure such as a procedure and a function may be implemented as separate software modules. The software modules may respectively perform one or more functions and operations described in the embodiments.

The methods according to various embodiments describe above may be stored on a non-transitory readable medium. The non-transitory readable medium may be embedded and used in various devices.

The non-transitory computer readable medium is not a medium that stores data for a short moment such as a register, a cash and a memory and the like, but a medium that stores data semi-permanently and which is readable by an apparatus. Specifically, programs for performing the above-described various methods can be stored in a non-transitory computer readable medium such as a CD, a DVD, a hard disk, a Blu-ray disk, universal serial bus (USB), a memory card, ROM, or the like, and can be provided.

The method according to the above-described various embodiments may be provided as being included in a computer program product. The computer program product may be traded as a product between a seller and a consumer. The computer program product may be distributed online in the form of machine-readable storage media (e.g., compact disc ROM (CD-ROM)) or through an application store (e.g., Play Store™ and App Store™). In the case of online distribution, at least a portion of the computer program product may be at least temporarily stored or temporarily generated in a server of the manufacturer, a server of the application store, or a storage medium such as memory of a relay server.

Although various embodiments have been illustrated and described hereinabove, the disclosure is not limited to the above-mentioned embodiments, but may be variously modified by those skilled in the art to which the disclosure pertains without departing from the scope and spirit of the disclosure as set forth in the accompanying claims. These modifications should also be understood to fall within the scope of the disclosure.

What is claimed is:

1. An electronic apparatus comprising:
    a display configured to play content;
    a voice receiver;
    a communication interface configured to connect to different mobile apparatuses; and
    a processor configured to:
        based on a user voice being obtained through the voice receiver while the display plays the content on an entire screen of the display, identify a user account matched with a voice print of the user voice among a plurality of user accounts associated with the different mobile apparatuses, respectively,
        identify a mobile apparatus having a same user account as the identified user account among the different mobile apparatuses communicably connected to the electronic apparatus through the communication interface,
        transmit a control signal for performing an operation corresponding to a user command corresponding to the user voice to the identified mobile apparatus through the communication interface,
        perform one from among: (i) based on the user voice being obtained through the voice receiver while the display plays the content on the entire screen of the display, stop the playing of the content and display, on the display, a mobile apparatus screen displayed on the identified mobile apparatus in which the operation corresponding to the user voice is performed, and (ii) based on the operation being completed and a new user command not being input within a predetermined time period after the operation is completed, stop displaying the mobile apparatus screen and resume the playing of the content on the entire screen of the display, and
        based on receiving, from the identified mobile apparatus, an operation completion signal informing that the operation corresponding to the user voice has been completed in the identified mobile apparatus while the display plays the content on the entire screen, display a message informing that the operation is completed on a part of the content so that the message overlaps the content being played on the entire screen,
    wherein the electronic apparatus is an apparatus for playing the content on the entire screen and for controlling the mobile apparatus based on the user voice, and the mobile apparatus is an apparatus to be controlled via the electronic apparatus,
    wherein the processor is further configured to divide the user voice into a first voice part and a second voice part, identify the user account matched with the voice print based on the first voice part, and identify the operation corresponding to the user voice based on the second voice part, and wherein the processor is further configured to:
 transmit a signal of the user voice to each of the different mobile apparatuses through the communication interface,
 receive a plurality of responses from the different mobile apparatuses through the communication interface, each of the plurality of responses corresponding to a respective mobile apparatus among the different mobile apparatuses, and
 based on a response transmitted from a mobile apparatus being included in the plurality of responses, identify the mobile apparatus that transmitted the response as the mobile apparatus having the same user account, the response indicating that the mobile apparatus has the user account matched with the voice print of the user voice.

2. The electronic apparatus as claimed in claim 1, further comprising:
 a memory configured to store the plurality of user accounts,
 wherein the processor is further configured to identify the user account matched with the voice print of the user based on one of the plurality of user accounts stored in the memory.

3. The electronic apparatus as claimed in claim 1, wherein the processor is further configured to:
 based on identifying the user voice as a command to display the mobile apparatus screen of the identified mobile apparatus, receive, through the communication interface, the mobile apparatus screen of the identified mobile apparatus, from the identified mobile apparatus, and
 based on the receiving of the mobile apparatus screen while the display plays the content, pause the playing of the content and display the mobile apparatus screen on the display.

4. The electronic apparatus as claimed in claim 1, wherein the processor is further configured to:
 based on the identifying of the user account, identify a plurality of mobile apparatuses that have the user account corresponding to the user voice among the different mobile apparatuses, and
 based on identifying context of the user voice, identify one mobile apparatus among the plurality of mobile apparatuses as the mobile apparatus to perform the operation corresponding to the user voice.

5. The electronic apparatus as claimed in claim 1, wherein the processor is further configured to:
 control the display to display a user interface (UI) for inputting a password for the user account, and
 receive the password for the user account input through the UI.

6. A method for controlling a mobile apparatus by an electronic apparatus, the method comprising:
 playing content on an entire screen of a display of the electronic apparatus;
 obtaining a user voice while the content is being played;
 identifying a user account matched with a voice print of the user voice among a plurality of user accounts associated with different mobile apparatuses, respectively;
 identifying a mobile apparatus having a same user account as the identified user account among the different mobile apparatuses connected to the electronic apparatus;
 transmitting a control signal for performing an operation corresponding to the user voice, to the identified mobile apparatus;
 performing one from among: (i) based on the user voice being obtained while the content is being displayed, stopping the playing of the content, and displaying, on the display, a mobile apparatus screen displayed on the identified mobile apparatus in which the operation corresponding to the user voice is performed, and, (ii) based on the operation being completed and a new user command not being input within a predetermined time period after the operation is completed, stopping displaying the mobile apparatus screen and resuming the playing of the content on the entire screen of the display; and
 based on receiving, from the identified mobile apparatus, an operation completion signal informing that the operation corresponding to the user voice has been completed in the identified mobile apparatus while the display plays the content on the entire screen, displaying a message informing that the operation is completed on a part of the content so that the message overlaps the content being played on the entire screen,
 wherein the electronic apparatus is an apparatus for playing the content on the entire screen and for controlling the mobile apparatus based on the user voice, and the mobile apparatus is an apparatus to be controlled via the electronic apparatus,
 wherein the identifying of the user account comprises dividing the user voice into a first voice part and a second voice part and identifying the user account matched with the voice print based on the first voice part,
 wherein the method further comprises identifying the operation corresponding to the user voice based on the second voice part, and
 wherein the identifying of the mobile apparatus comprises:
 transmitting a signal of the user voice to each of the different mobile apparatuses;
 receiving a plurality of responses from the different mobile apparatuses, each of the plurality of responses corresponding to a respective mobile apparatus among the different mobile apparatuses, and
 based on a response transmitted from a mobile apparatus being included in the plurality of responses, identifying the mobile apparatus that transmitted the response as the mobile apparatus having the same user account, the response indicating that the mobile apparatus has the user account matched with the voice print of the user voice.

7. The method as claimed in claim 6, wherein the identifying of the mobile apparatus further comprises:
 identifying the user account matched with the voice print of the user based on one of the plurality of user accounts stored in the electronic apparatus.

8. The method as claimed in claim 6, further comprising:
 based on identifying the user voice as a command to display the mobile apparatus screen of the identified mobile apparatus, receiving the mobile apparatus screen of the identified mobile apparatus, from the identified mobile apparatus; and based on the receiving of the mobile apparatus screen while the display plays the content, pausing the playing of the content and displaying the mobile apparatus screen on the display of the electronic apparatus.

9. A non-transitory computer readable medium which includes a program for executing a method for controlling a mobile apparatus by an electronic apparatus, the method including:

playing content on an entire screen of a display of the electronic apparatus;

obtaining a user voice while the content is being played;

identifying a user account matched with a voice print of the user voice among a plurality of user accounts associated with different mobile apparatuses, respectively;

identifying a mobile apparatus having a same user account as the identified user account among the different mobile apparatuses connected to the electronic apparatus;

transmitting a control signal for performing an operation corresponding to the user voice, to the identified mobile apparatus;

performing one from among: (i) based on the user voice being obtained while the content is being displayed, stopping the playing of the content, and displaying, on the display, a mobile apparatus screen displayed on the identified mobile apparatus in which the operation corresponding to the user voice is performed, and, (ii) based on the operation being completed and a new user command not being input within a predetermined time period after the operation is completed, stopping displaying the mobile apparatus screen and resuming the playing of the content on the entire screen of the display; and based on receiving, from the identified mobile apparatus, an operation completion signal informing that the operation corresponding to the user voice has been completed in the identified mobile apparatus while the display plays the content on the entire screen, displaying a message informing that the operation is completed on a part of the content so that the message overlaps the content being played on the entire screen, wherein the electronic apparatus is an apparatus for playing the content on the entire screen and for controlling the mobile apparatus based on the user voice, and the mobile apparatus is an apparatus to be controlled via the electronic apparatus, wherein the identifying of the user account comprises dividing the user voice into a first voice part and a second voice part and identifying the user account matched with the voice print based on the first voice part, wherein the method further comprises identifying the operation corresponding to the user voice based on the second voice part, and wherein the identifying of the mobile apparatus comprises:

transmitting a signal of the user voice to each of the different mobile apparatuses;

receiving a plurality of responses from the different mobile apparatuses, each of the plurality of responses corresponding to a respective mobile apparatus among the different mobile apparatuses, and based on a response transmitted from a mobile apparatus being included in the plurality of responses, identifying the mobile apparatus that transmitted the response as the mobile apparatus having the same user account, the response indicating that the mobile apparatus has the user account matched with the voice print of the user voice.

10. The non-transitory computer readable medium as claimed in claim 9, wherein the identifying of the mobile apparatus further includes:

identifying the user account matched with the voice print of the user based on one of the plurality of user accounts stored in the electronic apparatus.

11. The non-transitory computer readable medium as claimed in claim 9, wherein the method further includes:

based on identifying the user voice as a command to display the mobile apparatus screen of the identified mobile apparatus, receiving the mobile apparatus screen of the identified mobile apparatus, from the identified mobile apparatus; and based on the receiving of the mobile apparatus screen while the display plays the content, pausing the playing of the content and displaying the mobile apparatus screen on the display of the electronic apparatus.

\* \* \* \* \*